US008626943B2

(12) United States Patent
Balachandran et al.

(10) Patent No.: US 8,626,943 B2
(45) Date of Patent: Jan. 7, 2014

(54) CONTENT ATE SELECTION FOR MEDIA SERVERS WITH PROXY-FEEDBACK-CONTROLLED FRAME TRANSMISSION

(75) Inventors: Krishna Balachandran, Morganville, NJ (US); Doru Calin, Manalapan, NJ (US); Eunyoung Kim, Basking Ridge, NJ (US); Kiran M. Rege, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/064,288

(22) Filed: Mar. 16, 2011

(65) Prior Publication Data
US 2011/0225317 A1    Sep. 15, 2011

Related U.S. Application Data

(62) Division of application No. 12/222,896, filed on Aug. 19, 2008.

(60) Provisional application No. 60/966,020, filed on Aug. 24, 2007, provisional application No. 60/966,017, filed on Aug. 24, 2007.

(51) Int. Cl.
*G06F 15/16* (2006.01)

(52) U.S. Cl.
USPC .......................................... 709/232; 709/228

(58) Field of Classification Search
USPC ............... 709/228, 231, 232; 370/235, 232.1
See application file for complete search history.

(56) References Cited

U.S. PATENT DOCUMENTS

| 6,101,193 | A  | * | 8/2000  | Ohba ............................. 370/429 |
| 6,430,187 | B1 | * | 8/2002  | Park ............................. 370/397 |
| 6,460,036 | B1 |   | 10/2002 | Herz |
| 6,674,721 | B1 | * | 1/2004  | Dittia et al. ................... 370/235 |
| 6,690,647 | B1 | * | 2/2004  | Tang et al. ..................... 370/235 |
| 7,007,062 | B1 |   | 2/2006  | Serenyi et al. |
| 7,043,558 | B2 |   | 5/2006  | Yoshida et al. |

(Continued)

FOREIGN PATENT DOCUMENTS

| EP | 1 209 838      | 5/2001  |
| EP | 1 610 520      | 6/2004  |
| WO | WO 2004091151  | 10/2004 |

OTHER PUBLICATIONS

Written Opinion dated Mar. 16, 2009 for International Application No. PCT/US2008/009960.

(Continued)

*Primary Examiner* — Hee Soo Kim
(74) *Attorney, Agent, or Firm* — Harness, Dickey & Pierce

(57) ABSTRACT

In a method for dynamically setting a content rate of a multimedia session for a client in a network, a proxy server receives a channel condition feedback message from a network controller and determines whether a receiver report message has been received from the client since a most recent previous channel condition feedback message. The channel condition feedback message includes current channel condition information for the network. The proxy server sends one of an extended feedback report message and a short feedback report message to a media server based on the determining step. The short feedback report message includes at least a maximum transmission rate parameter for the multimedia session. The extended feedback report message includes at least information contained in the receiver report message. The extended feedback report message may, in addition, include the maximum transmission rate parameter for the multimedia session.

4 Claims, 8 Drawing Sheets

(56) References Cited

U.S. PATENT DOCUMENTS

| | | |
|---|---|---|
| 7,068,607 B2 | 6/2006 | Partain et al. |
| 7,076,552 B2 | 7/2006 | Mandato |
| 7,161,907 B2 | 1/2007 | Mott |
| 7,225,267 B2 | 5/2007 | Key et al. |
| 7,251,216 B2 | 7/2007 | Dube et al. |
| 7,251,218 B2 | 7/2007 | Jorgensen |
| 7,269,157 B2 | 9/2007 | Klinker et al. |
| 7,327,708 B2 | 2/2008 | Komandur et al. |
| 7,346,007 B2 | 3/2008 | Curcio et al. |
| 7,346,676 B1 | 3/2008 | Swildens et al. |
| 7,380,014 B2 | 5/2008 | LeCroy et al. |
| 7,443,797 B2 | 10/2008 | Cheung et al. |
| 7,477,602 B2 | 1/2009 | Ling et al. |
| 7,529,250 B2 | 5/2009 | Pedersen |
| 7,529,263 B1 | 5/2009 | Sparrell et al. |
| 7,617,337 B1 | 11/2009 | Beck et al. |
| 7,634,373 B2 | 12/2009 | Batterberry et al. |
| 7,653,002 B2 | 1/2010 | Hardy et al. |
| 7,653,735 B2 | 1/2010 | Mandato et al. |
| 7,688,729 B2 | 3/2010 | Ooghe et al. |
| 7,698,453 B2 | 4/2010 | Samuels et al. |
| 7,701,915 B2 | 4/2010 | Curcio et al. |
| 7,710,879 B2 | 5/2010 | Clark |
| 7,764,679 B2 | 7/2010 | MeLampy et al. |
| 7,779,146 B2 | 8/2010 | Deshpande |
| 7,788,354 B2 | 8/2010 | Nag |
| 7,873,346 B2 | 1/2011 | Petersson et al. |
| 7,883,419 B2 | 2/2011 | Cheung et al. |
| 7,991,905 B1 | 8/2011 | Roussos et al. |
| 8,015,306 B2 | 9/2011 | Bowman |
| 2002/0089928 A1 | 7/2002 | Morikawa et al. |
| 2002/0194609 A1* | 12/2002 | Tran ................................ 725/95 |
| 2003/0140159 A1 | 7/2003 | Campbell et al. |
| 2003/0161302 A1* | 8/2003 | Zimmermann et al. ...... 370/363 |
| 2003/0198184 A1 | 10/2003 | Huang et al. |
| 2004/0098748 A1 | 5/2004 | Bo et al. |
| 2004/0103141 A1* | 5/2004 | Miller et al. .................. 709/203 |
| 2004/0186877 A1* | 9/2004 | Wang et al. .................... 709/200 |
| 2004/0193762 A1* | 9/2004 | Leon et al. ....................... 710/52 |
| 2004/0240390 A1 | 12/2004 | Seckin |
| 2005/0180448 A1 | 8/2005 | Kobayashi |
| 2006/0095472 A1 | 5/2006 | Krikorian et al. |
| 2006/0253600 A1 | 11/2006 | Hannuksela |
| 2007/0091815 A1 | 4/2007 | Tinnakornsrisuhap et al. |
| 2007/0153801 A1 | 7/2007 | Sung et al. |
| 2007/0174474 A1 | 7/2007 | Zhong et al. |
| 2007/0198739 A1 | 8/2007 | Jennings et al. |
| 2008/0013545 A1 | 1/2008 | Ono et al. |
| 2008/0123660 A1 | 5/2008 | Sammour et al. |
| 2008/0137541 A1 | 6/2008 | Agarwal et al. |
| 2008/0192710 A1 | 8/2008 | Balachandran et al. |
| 2008/0192711 A1 | 8/2008 | Balachandran et al. |
| 2008/0195755 A1 | 8/2008 | Lu et al. |

OTHER PUBLICATIONS

International Search Report dated Mar. 16, 2009 for International Application No. PCT/US2008/009960.

Written Opinion dated Apr. 2, 2009 for International Application No. PCT/US2008/009968.

International Search Report dated Apr. 2, 2009 for International Application No. PCT/US2008/009968.

International Preliminary Search Report on Patentability dated Mar. 4, 2010.

Office Action for corresponding U.S. Appl. No. 12/222,897 dated May 24, 2010.

Office Action for corresponding U.S. Appl. No. 12/222,897 dated Nov. 19, 2010.

International Search Report and Written Opinion mailed Jul. 9, 2008.

ETSI TS 126 234 V6. 10.0 (Dec. 2006) *Universal Mobile Telecommunications Systems (UMTS); Transparent end-to-end Packet-switched Streaming Service (PSS); Protocols and Codecs* (3 GPP TS 26.234 version 6.10.0 Release 6).

U.S. Office Action dated Mar. 5, 2013 for related U.S. Appl. No. 12/222,897.

* cited by examiner

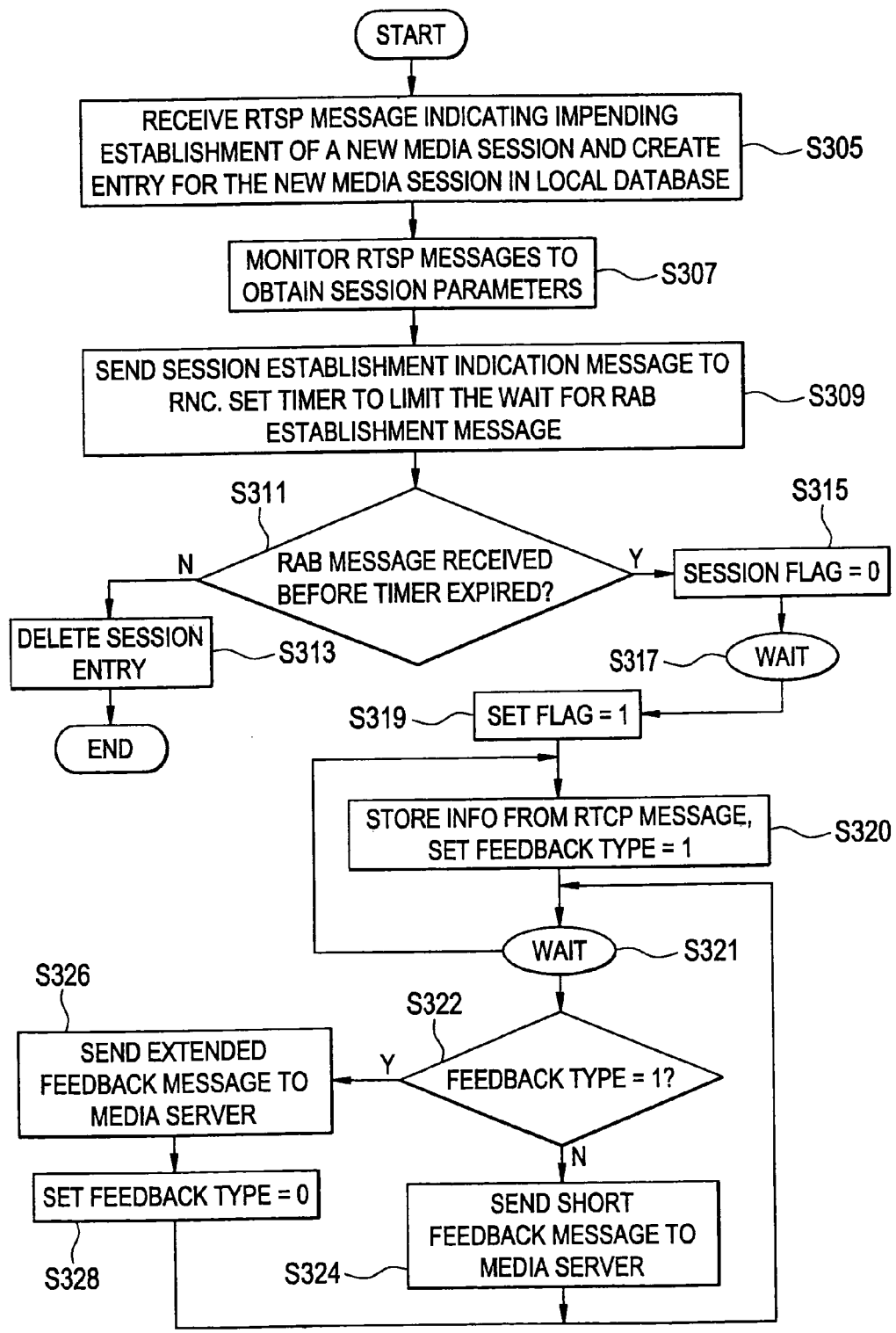

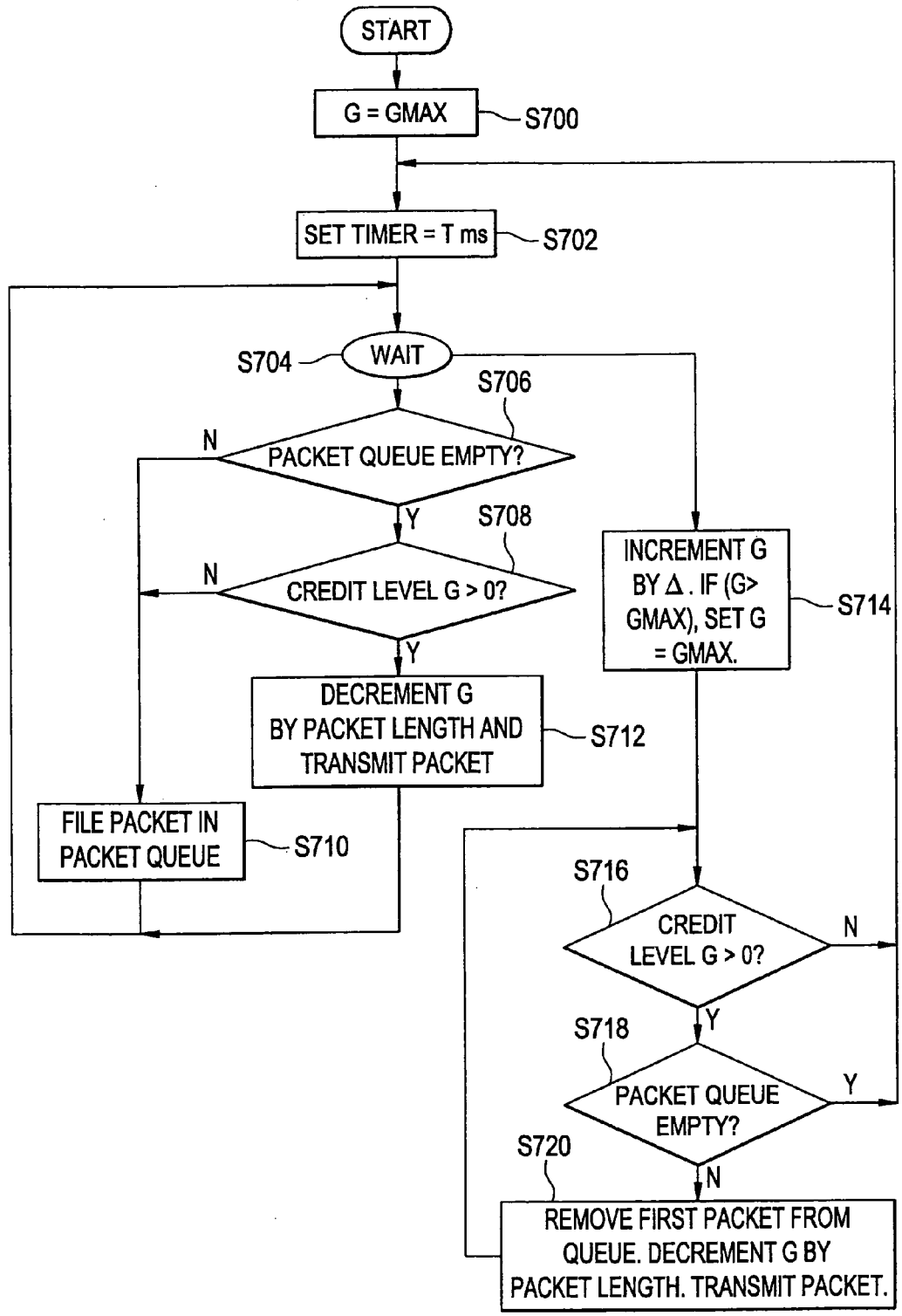

CONTENT ATE SELECTION FOR MEDIA SERVERS WITH PROXY-FEEDBACK-CONTROLLED FRAME TRANSMISSION

PRIORITY STATEMENT

This non-provisional patent application is a divisional application of U.S. Ser. No. 12/222,896 filed on Aug. 19, 2008, and claims priority under 35 U.S.C. §119(e) to provisional patent application No. 60/966,020 to Krishna Balachandran, Doru Calin, Eunyoung Kim and Kiran Rege, filed on Aug. 24, 2007, and provisional patent application No. 60/966,017 to Krishna Balachandran, Doru Calin, Eunyoung Kim and Kiran Rege, filed on Aug. 24, 2007. The entire contents of each these applications is incorporated herein by reference.

CROSS REFERENCE TO RELATED APPLICATIONS

This non-provisional patent application is related to U.S. patent application Ser. Nos. 11/674,802 to Krishna Balachandran, Doru Calin, Eunyoung Kim and Kiran Rege, filed on Feb. 14, 2007, and Ser. No. 11/674,858 to Krishna Balachandran, Doru Calin, Eunyoung Kim and Kiran Rege, filed on Feb. 14, 2007, the entire contents of each of these applications is also incorporated herein by reference.

BACKGROUND OF THE INVENTION

Description of the Related Art

Streaming media services (e.g., music, video, etc.) over wireless communication networks have been gaining in popularity over the past few years, and are likely to become commercially important to wireless service providers in the near future. A major impediment to their success is the often poor and/or unreliable quality associated with the services. In one example, this lack of reliability results from significant fluctuations in the rate at which packets carrying a media stream are delivered to mobile units. These fluctuations stem from variations in signal strength and the need to share the wireless access medium among multiple mobile units.

In another example, fluctuations in the rate at which packets are delivered to mobile units result from delay and/or loss of packets as they traverse a wireless link on the path between the media server and the mobile units. Conventionally, effects of lost packets, delayed packets, and/or jitter are reduced by buffering the received data stream at the mobile units. But, buffering alone is insufficient for ensuring acceptable media quality.

FIG. 1 conceptually illustrates a conventional system for streaming media to mobile units or clients over a wireless network.

Referring to FIG. 1, the portion of the wireless network 100 between the Gateway GPRS Support Node (GGSN) 120 and the media server 115 is referred to as the core network 105. The network segment between the GGSN 120 and the mobile client 110 (inclusive of GGSN 120 and mobile client 110) will be referred to as the wireless access network 125.

Conventionally, a mobile unit or client 110 (hereinafter referred to as a client) initiates a streaming multimedia (or media) session with a media server 115 via the wireless network 100. In one example, the client 110 requests a streaming video session by sending a real-time streaming protocol (RTSP) message to the media server 115. The mobile client 110 exchanges signaling messages with the media server 115 to establish the streaming video session and negotiate session parameters (e.g., the bit-rate at which the media is to be streamed).

In establishing a media session, the mobile client 110 also exchanges lower-layer signaling messages with radio access network elements such as the radio network controller (RNC) 130, the SGSN 103, and the GGSN 120 to establish a radio access bearer (RAB) channel. RAB channels are typically configured to maintain desired Quality-of-Service (QoS) characteristics, for example, if best-effort bearer service is deemed inadequate.

Once the RAB channel and the streaming media session are established, the media server 115 transmits packets carrying the media to the mobile client 110 via the GGSN 120, the SGSN 103, the RNC 130, and the base station 107. The mobile client 110 sends periodic feedback messages along the reverse path which traverses the base station 107 to the RNC 130, SGSN 103, GGSN 120, and, finally, the media server 115. Uplink feedback messages from the mobile client 110 are transmitted relatively infrequently, for example, once every 3-4 seconds.

The media server 115 also transmits control/signaling messages to the mobile client 110 on a periodic basis. These "server reports" are carried transparently by the network elements. Conventionally, downlink packets carrying the media and control/signaling messages and uplink feedback messages transmitted by the mobile client 110 are all carried transparently by the network elements. Thus, the feedback messages from the mobile client 110 that assist the media server 115 in making control decisions (such as changing transmission or content rate) are essentially end-to-end; that is, they do not carry any information available only to the intervening network elements.

Accordingly, in the conventional system shown in FIG. 1, control decisions by the media server 115 are based on rather infrequent feedback received from the mobile client 110, and without direct knowledge of the channel conditions. As a result, the media server 115 cannot make timely decisions to avoid packet loss and/or re-buffering events that are detrimental to the quality of the streaming media service.

SUMMARY OF THE INVENTION

In a method of scheduling frame transmission for a multimedia session for a client in a network, a media server determines whether a token bucket packet queue associated with the multimedia session is empty, and calculates a size of a frame to be transmitted to the client if the token bucket packet queue is empty. A buffer level at the client including the frame is estimated. The buffer is associated with the multimedia session. The frame is packetized for transmission to the client, and the packet is scheduled for transmission.

In a method for dynamically setting a content rate for a multimedia session for a client in a network, multimedia frames are streamed from a media server to a client at a first content rate. The media server sets a content rate for the multimedia session in response to a proxy-to-server message from a proxy server. The content rate is set according to a maximum transmission rate parameter included in a proxy-to-server message. The proxy-to-server message is one of an extended feedback report message and a short feedback report message. Dynamic adjustment of the content rate is selectively performed based on whether the proxy-to-server message is an extended feedback report message or a short feedback report message.

In a method for dynamically setting a content rate of a multimedia session for a client in a network, a proxy server receives a channel condition feedback message from a network controller and determines whether a receiver report message has been received from the client since a most recent previous channel condition feedback message. The channel condition feedback message includes current channel condition information for the network. The proxy server sends one of an extended feedback report message and a short feedback report message to a media server based on the determining step. The short feedback report message includes at least a maximum transmission rate parameter for the multimedia session. The extended feedback report message includes at least information contained in the receiver report message in addition to at least the maximum transmission rate parameter for the multimedia session.

In a method for rate-control of a multimedia session for a client in a network, the media server determines whether to transmit a packet to the client based on a state variable associated with the multimedia session for the client and the current state of a token bucket packet queue associated with the multimedia session. The packet is selectively transmitted to the client based on the determining step.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein:

FIG. 3 illustrates a method for content rate selection at a signaling proxy according to example embodiments;

FIGS. 5-7 illustrate methods for dynamic frame transmission scheduling according to example embodiments.

DETAILED DESCRIPTION OF THE EMBODIMENTS

Figure 1:
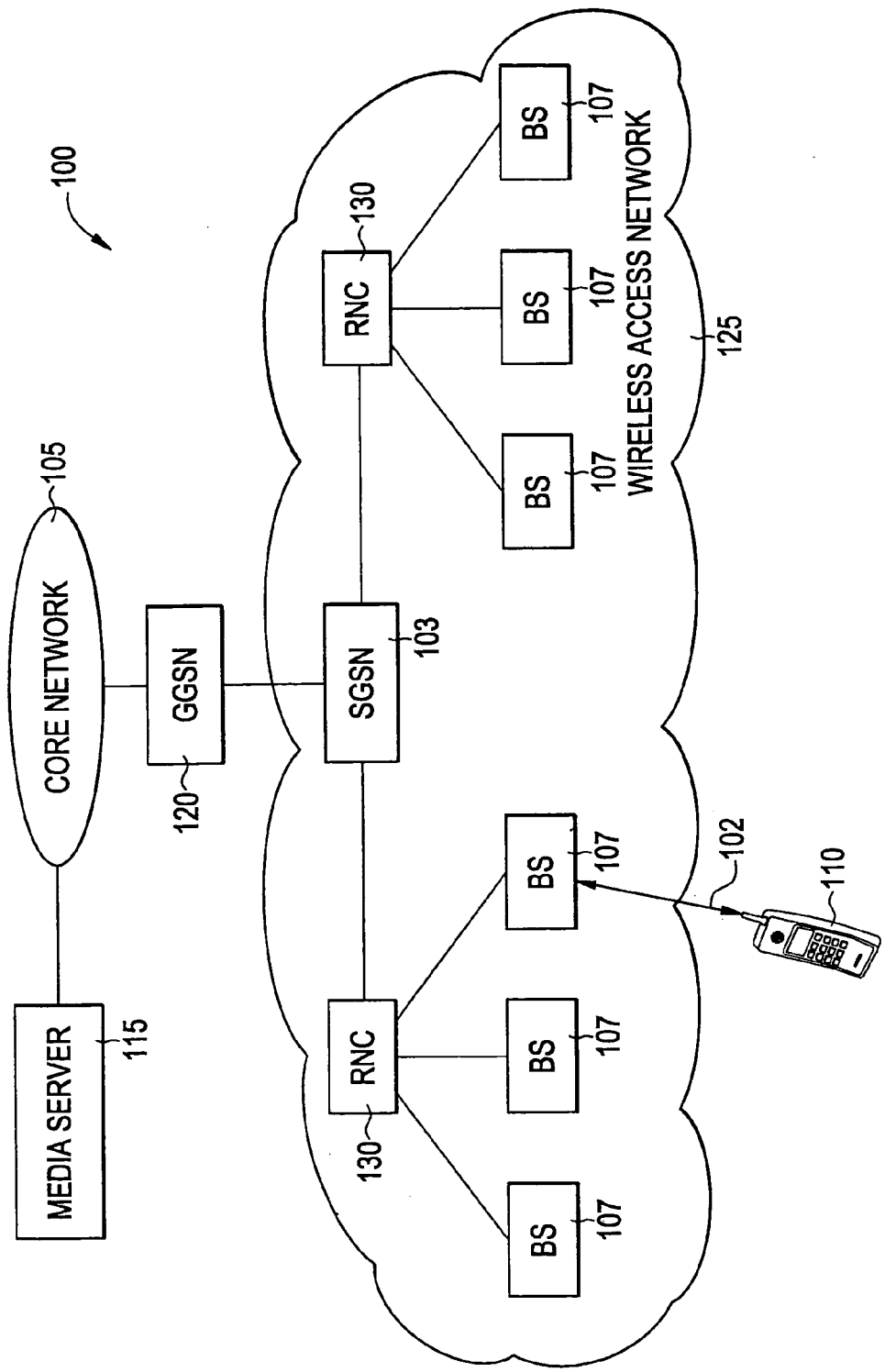
FIG. 1 illustrates a conventional system for streaming media over a wireless network.

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples. Where applicable, the words and phrases used herein should be understood and interpreted to have a meaning consistent with the understanding of those words and phrases by those skilled in the relevant art.

As used herein, the term "mobile client" may be considered synonymous to, and may hereafter be occasionally referred to, as a client, mobile, mobile unit, mobile station, mobile user, user equipment (UE), subscriber, user, remote station, access terminal, receiver, etc., and may describe a remote user of wireless resources in a wireless communication network. The term "base station" may be considered synonymous to and/or referred to as a base transceiver station (BTS), NodeB, extended Node B, femto cell, access point, etc. and may describe equipment that provides the radio baseband functions for data and/or voice connectivity between a network and one or more users.

Figure 2:
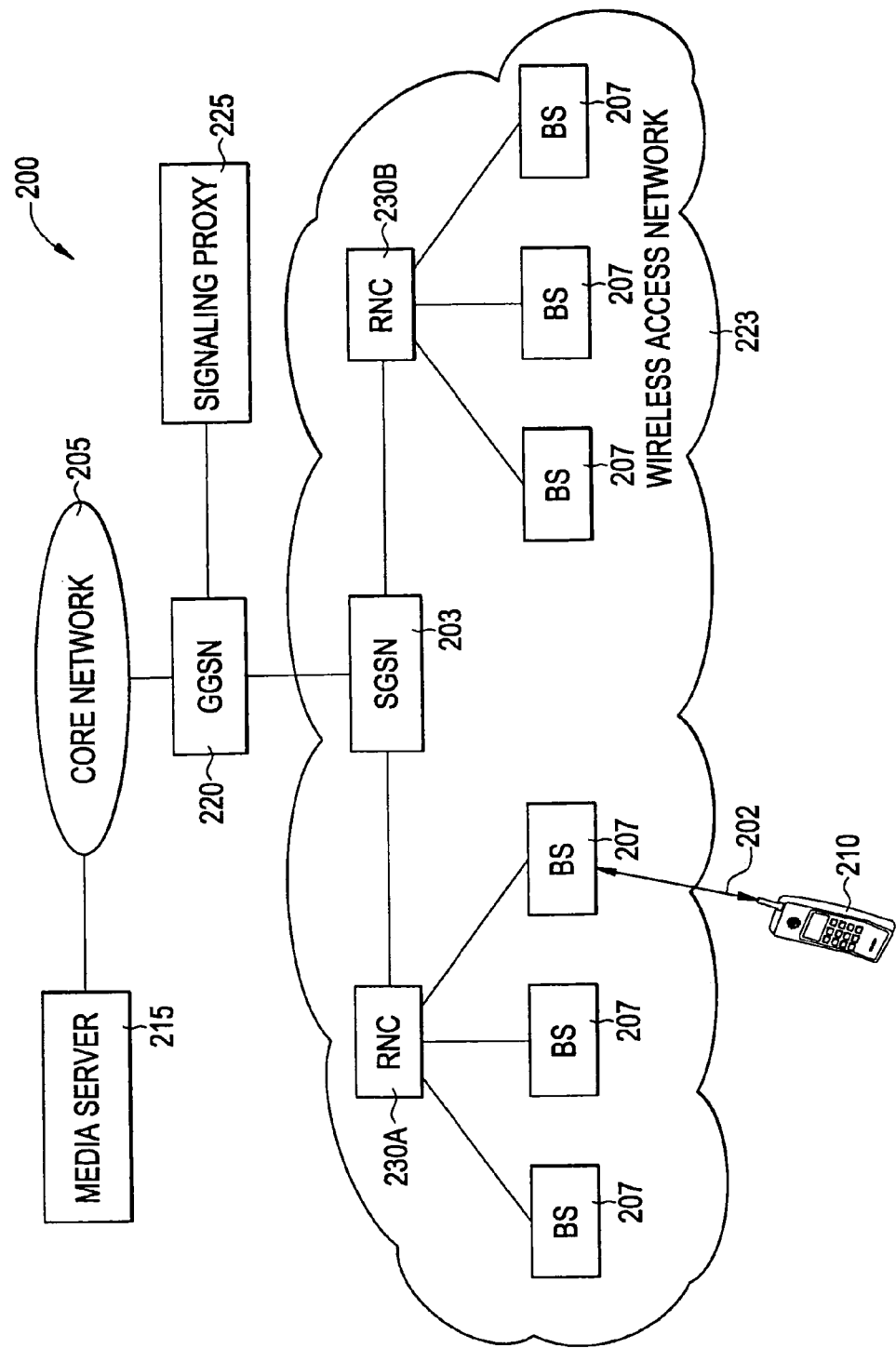
FIG. 2 illustrates a system for streaming media over a wireless network according to an example embodiment.

FIG. 2 conceptually illustrates an example embodiment of a system for streaming media over a wireless network. The entire network between the media server 215 and mobile client 210 is referred to as a wireless network, even though it may comprise wireless as well as wired segments. The network segment between GGSN 220 and mobile client 210 will be referred to as the wireless access network 223.

Referring to FIG. 2, the wireless access network 223 includes one or more base stations 207 to stream media over an air interface to one or more mobile clients or units 210 (referred to as "clients"). The media (e.g., audio, video, etc.)

is provided by a media server 215 via a Gateway GPRS Support Node (GGSN) 220, a Serving GPRS Support Node (SGSN) 203, and a radio network controller (RNC) 230A. The wireless access network 223, the base stations 207, the client 210, the media server 215, the SGSN 203, the GGSN 220, and the RNCs 230A, 230B may operate according to the Universal Mobile Telecommunication System (UMTS) (3GPP) standards and/or protocols.

In streaming media sessions, the Real-time Transport Protocol (RTP) may be used to carry the media content (e.g., voice, video, audio, etc.) and the associated Real Time Control Protocol (RTCP) may be used to carry the associated control packets. RTCP messages will be discussed in somewhat more detail below. The Real Time Streaming Protocol (RTSP) may be used for the transmission of messages for session setup (including capability negotiation/exchange), teardown, and some user actions (e.g., pause, fast-forward, etc.).

Details regarding RTP/RTCP and RTSP are well-known as discussed in the Internet Engineering Task Force Requests for Comments (IETF RFCs) 1889 and 2326, respectively.

Although example embodiments are discussed with regard to particular standards and/or protocols, example embodiments may also be applied to any other wireless networking technology and standards, for example, cdma2000 High Rate Packet Data (HRPD) or IEEE 802.16e/WiMAX. In the case of cdma2000 HRPD, for instance, system 200 would appear identical to that in FIG. 2, except that the Serving GPRS Support Node (SGSN) 203 and the Gateway GPRS Support Node (GGSN) 220 would be replaced by a single entity known as the Packet Data Serving Node (PDSN). In the case of 802.16e/WiMAX, the SGSN 203, GGSN 220 and certain functions performed by the RNC 230 may be incorporated into a single entity known as the access service network (ASN) gateway.

Furthermore, although a hierarchical architecture is illustrated, the techniques described herein may also be applied to flat-Internet Protocol (flat-IP) based architectures where Layer 3 (IP) routing and control functions relating to the wireless access network 223 are performed by the base station 207.

According to example embodiments, the client 210 supports standard RTSP/RTCP signaling with or without 3GPP extensions for transparent end-to-end packet-switched streaming services.

During a media session the client 210 periodically sends RTCP (feedback) packets ("receiver report messages" or "receiver reports") towards the media server 215 to apprise the media server 215 of performance metrics such as: fraction of packets lost (since the last similar report), cumulative number of packets lost, highest (RTP) sequence number received, RTP timestamp associated with the last sender's report (received from the server), time since receiving the last sender's report, RTP sequence number associated with the next application data unit to be decoded, the delay until the decoding of the next application data unit, free buffer space (at the client), and the like. The last three of the preceding list of performance metrics are in accordance with the 3GPP extensions for packet-switched streaming services whereas the rest are more standard feedback items included in receiver report messages. Other than these items included in the receiver reports, each RTCP packet may also carry a timestamp that can be used by the server to relate the report to a specific point in time. The client 210 may send the RTCP feedback packets at a rate consistent with its own capability and the capacity of the wireless network. Typically, such feedback packets are sent rather infrequently—for example, once every 3 to 4 seconds. Hereinafter, the interval at which the client 210 sends RTCP feedback packets is denoted by $T_R$.

Still referring to FIG. 2, the wireless communication system 200 further includes a signaling proxy 225. The signaling proxy 225 may be implemented as a proxy server and is attached to a wireless access network entity, such as the Gateway GPRS Support Node (GGSN) 220. But, the signaling proxy 225 may be attached to other access network entities such as the Serving GPRS Support Node (SGSN) 203 or the Radio Network Controller (RNC) 230A, 230B in other embodiments.

In yet another example, the signaling proxy 225 may be attached to the base stations themselves in the case of an access network including base-station routers that are characterized by a flat architecture.

As discussed in co-pending and related patent application Ser. No. 11/674,858 to Balachandran et al., when establishing, tearing down and during a media session, the client 210 sends RTSP and/or RTCP messages intended for the media server 215 over the wireless network 200. According to example embodiments, the GGSN 220 intercepts the RTSP and RTCP messages from the client 210 and sends these messages to the signaling proxy 225 instead of the media server 215.

FIG. 3 illustrates an example embodiment of a method for dynamically setting content rate for a media session in a wireless network. The method in FIG. 3 is performed in response to receiving an initial RTSP message from the client 210 via the GGSN 220. The method of FIG. 3 will be discussed with regard to the network shown in FIG. 2, and in particular, as being performed at the signaling proxy 225.

Referring to FIGS. 2 and 3, at step S305 signaling proxy 225 creates an entry for the new media session in its local database (not shown) in response to an initial RTSP message from the client 210. The initial RTSP message indicates impending establishment of a new media session.

At step S307, the signaling proxy 225 monitors subsequent RTSP messages exchanged between the client 210 and the media server 215 during the media session's capability negotiation phase to obtain session parameters from the RTSP messages (e.g., client buffer size, time interval at which a receiver report is sent, etc.). Because the manner in which the capability negotiation and session establishment are performed is well-known in the art, and thus, a detailed discussion will be omitted.

When the signaling proxy 225 learns that a media session is about to be established (e.g., via a "SETUP" RTSP message from the client), the signaling proxy 225 sends a session establishment indication message to the RNC 230A (at step S309) through which the corresponding media stream is to be delivered.

Also at step S309, the signaling proxy 225 sets a timer designating a time period during which the signaling proxy 225 waits for an RAB establishment message from the RNC 230A. Upon expiration of the timer, if the signaling proxy 225 has not received an RAB establishment message from the RNC 230A (at step S311), the signaling proxy 225 deletes the session entry from its local database (at step S313) and the process terminates.

Returning to step S311, if the signaling proxy 225 receives an RAB establishment message for the impending media session before the timer expires, the signaling proxy 225 turns off the timer and sets a session flag to 0 at step S315. The signaling proxy 225 then enters a wait state at step S317. During the wait state, the signaling proxy 225 waits for channel/network condition feedback messages from the RNC 230A and receiver report (or RTCP) messages from the client 210. As discussed herein, the channel/network condition feedback messages are also referred to as network condition feedback messages or channel condition feedback messages. Channel/network condition feedback messages include current channel condition information for the network. Current channel condition information for the network includes, for example, an identifier of the feedback source, a maximum transmission rate parameter $W_S$, and optionally, other relevant performance metrics such as the number of Internet Protocol (IP) packets belonging to the media session that are waiting in a buffer at the RNC 230A, the corresponding byte count, and the like.

The maximum transmission rate parameter $W_S$ may be computed based on the number of IP packets delivered to the client 210 during the preceding channel condition feedback interval (of length $T_P$ seconds), the number of transmission opportunities available to the media session and the number of transmission opportunities actually used to carry data during the preceding interval. With a dedicated channel, a transmission block belonging to the dedicated channel represents a transmission opportunity.

In a more detailed example, the maximum transmission rate parameter $W_S$ for the $n^{th}$ interval of duration $T_P$ seconds, may be set equal to the available bandwidth parameter $W_A(n)$, which is given by (in units of bytes per second):

$$W_A(n) = M_D(n) * K_A(n) / (K_U(n) * T_P).$$

In the above equation, $K_A(n)$ and $K_U(n)$ respectively denote the number of transmission opportunities available to the media session and the number of transmission opportunities actually used to carry data during the during the $n^{th}$ channel condition feedback interval (of length $T_P$ seconds). Variable $M_D(n)$ denotes the byte count associated with the packets actually delivered to the client 210 during this interval. The maximum transmission rate parameter for the $n^{th}$ channel/network condition feedback interval $W_S(n)$ may be set equal to the available bandwidth parameter $W_A(n)$, or may be set according to the following heuristic:

$$W_S(n) = a_L * W_A(n) \text{ if } Q(n) < \beta_L,$$
$$= a_H * W_A(n) \text{ if } Q(n) > \beta_H,$$
$$= W_A(n) \text{ otherwise.}$$

In the above heuristic, $Q(n)$ is the amount of data belonging to the media session that is queued up in the RNC 230A buffer at the end of the $n^{th}$ channel/network condition feedback interval. $\beta_H$ is some "high watermark," and $\beta_L$ is some "low watermark," with $\beta_H > \beta_L$. Parameters $\alpha_L$ and $\alpha_H$ are constants with $\alpha_H < 1$ and $\alpha_L > 1$.

In one example, with a 20-Kbyte per-session dedicated RNC 230A buffer, $\beta_H$ and $\beta_L$ may be set equal to 10 Kbytes and 2 Kbytes, respectively, whereas $\alpha_H$ and $\alpha_L$ might be set equal to 0.5 and 1.5 respectively.

The signaling proxy 225 expects to receive a channel/network condition feedback message from the RNC 230A every $T_P$ seconds and a receiver report message from the client device 210 every $T_R$ seconds.

Still referring to step S317 in FIG. 3, when the signaling proxy 225 receives a first receiver report message from the client 210, the signaling proxy 225 sets the session flag to 1 at step S319. The signaling proxy 225 then stores relevant information from the received receiver report message and sets a feedback type indicator to 1 at S320. The feedback type indicator is set to 1 whenever the signaling proxy receives (and processes) a receiver report message from the client 210.

As noted above, the signaling proxy 225 receives channel/network condition feedback messages from the RNC 230A relatively frequently (e.g., once every 100 ms). But, the signaling proxy 225 ignores the channel/network condition feedback messages so long as the session flag equals 0. After the first receiver report message is received and the session flag is set to 1 at step S319, the signaling proxy 225 enters another wait state at step S321. In this state, the signaling proxy 225 waits for channel/network condition feedback messages from RNC 230A and receiver report messages from the client 210.

Still referring to step S321 in FIG. 3, in response to a received channel/network condition feedback message from the RNC 230A, the signaling proxy 225 determines whether the feedback type indicator equals 1 at step S322. If the feedback type indicator is set to 1, the signaling proxy 225 sends a proxy-to-server feedback message including an extended feedback report (referred to herein as an extended feedback report message) to the media server 215 at step S326. The signaling proxy 225 then resets the feedback type indicator to 0 at step S328. After transmitting the extended feedback report message to the media server 215, the signaling proxy 225 returns to the wait state at step S321.

The extended feedback report message is in the form of an RTCP packet and includes all of the information contained in the most recently received receiver report message from the client 210 (e.g., the highest RTP sequence number received, the next application data unit to be decoded, etc.) as well as the maximum transmission rate parameter ($W_s$). In addition, the extended feedback report may include other parameters included in the most recently received channel/network condition feedback message from the RNC 230A.

In another embodiment, the signaling proxy 225 may wait to receive multiple channel/network condition feedback messages, process these messages and generate modified channel/network condition feedback in the form of a modified maximum transmission rate parameter modWs. In one example, the modified maximum transmission rate parameter modWs may be computed as a weighted average of the maximum transmission rate parameter Ws reported in the last K channel/network condition feedback messages (where K is an integer). In yet another embodiment, the signaling proxy 225 may generate a modified channel/network condition feedback by jointly processing the most recently received channel/network condition feedback message along with processed information stored from previously received channel/network condition feedback messages and/or receiver reports.

Example embodiments will be discussed herein with regard to the maximum transmission rate parameter Ws, however, it will be understood that above discussed modified maximum transmission rate parameter modWs may be used instead of the maximum transmission rate parameter Ws.

When the signaling proxy 225 sends an extended feedback report message to the media server 215, the signaling proxy 225 uses the RTP timestamp of the most recent receiver report message from the client 210 as the RTP timestamp of the extended feedback report message.

Returning to step S322. in response to the received channel/network condition feedback message, if the signaling proxy 225 determines that the feedback type indicator equals 0, the signaling proxy 225 sends a proxy-to-server feedback message including a short feedback report (hereinafter referred to as a short feedback report message) at step S324. The short feedback report message may also be in the form of an RTCP packet. The short feedback report includes at least the maximum transmission rate parameter ($W_S$), but may also include the above-discussed other parameters included in the most recently received network/channel condition feedback message from the RNC 230A. Unlike the extended feedback report message, however, the short feedback report message does not include the receiver report information.

When the signaling proxy 225 sends a short feedback report message, the signaling proxy 225 uses its local clock-time to generate an RTP time stamp. The signaling proxy 225 may use the RTP timestamps associated with the receiver report messages from the client 210 to synchronize its clock time with the clock time of the client 210.

After transmitting the short feedback report message to the media server 215, the signaling proxy 225 returns to the wait state at step S321 and continues as discussed herein.

Returning once again to step S321, if the message received in the wait state is a receiver report message from the client 210, the signaling proxy 225 returns to step S320, performs the actions associated therewith, and enters the wait state at step S321.

When the media session is terminated with appropriate RTSP messages from the client 210 or the media server 215, the signaling proxy 225 deletes the entry for that session in its local database, stops sending proxy-to-server feedback messages to the media server 215, and instructs the RNC 230A to stop sending channel/network condition feedback messages.

While example embodiments are discussed herein with respect to an extended feedback report generated by combining the information from the most recent receiver report message from the client 210 with the information contained in the most recent network/channel condition feedback message from the RNC 230A, the information from the most recent receiver report messages and the information from the most recent network/channel condition feedback messages may be kept separate, and reported to the media server 215 separately. In such an arrangement, whenever the signaling proxy 225 receives a receiver report message from the client 210, the signaling proxy 225 forwards the received receiver report message to the media server 215 (e.g., after recording at least a portion of the information contained therein).

Similarly, upon receiving a network/channel condition feedback message form the RNC 230A, the signaling proxy 225 sends a separate proxy-to-server message to the media server 215 containing the maximum transmission rate parameter $W_S$ and other relevant information included in the network/channel condition feedback message.

As discussed above, the signaling proxy 225 sends proxy-to-server feedback messages to the media server 215 periodically (at regular intervals). The intervals of periodicity may be on the order of hundreds of milliseconds (e.g., about 100 ms to about 1000 ms or 1 second). In response to at least some of these messages, the media server 215 may set the content rate for a media session.

Content rate refers to the rate at which media (e.g., voice, video, audio, etc.) is played out during a media session. The content rate corresponds to the average transmission rate needed to carry a corresponding media stream. A given content rate for a media stream can be realized by a combination of appropriate encoding and thinning. Typically, the higher the content rate, the better the media quality for the end-user.

From the viewpoint of the media server 215, methods for content rate selection begin upon receipt of an initial RTSP message from the client 210 (forwarded from the signaling proxy 225). The RTSP message informs the media server 215 of the client 210's desire to set up a media session. The media server 215 then participates in the ensuing messaging for capability negotiation (exchange) and session establishment.

In the case where the media is being streamed from a storage device, the media can be encoded at different content rates and stored for future use. For a live streaming media session, the encoding may be done "on the fly." When the media is being streamed, the media server 215 selects the content rate for the media, and, based on the selected content rate, the media server 215 fetches the appropriate files containing media frames, packetizes these files, and transmits the selected files toward the client 210. Content rate selection is typically performed often through the duration of the media session.

Once the capability exchange and session establishment is complete, the media server 215 begins streaming media frames to the client 210. The media server 215 also begins receiving proxy-to-server feedback messages from the signaling proxy 225.

During streaming media sessions, the media server 215 performs dynamic content rate selection and frame transmission scheduling.

The objective of content rate selection at the media server 215 is to maximize media quality within the constraints imposed by current channel conditions. After initially setting the content rate for the media session based on the parameters negotiated with the client 210 during session setup, the media server 215 dynamically adjusts the content rate for the media session based on fluctuating channel conditions.

Because the buffer state at the client 210 provides an indication of whether the current content rate is sustainable, can be raised, or needs to be lowered in view of the current channel conditions, the media server's content rate selection decisions are driven by the feedback from the client 210.

Figure 4A:
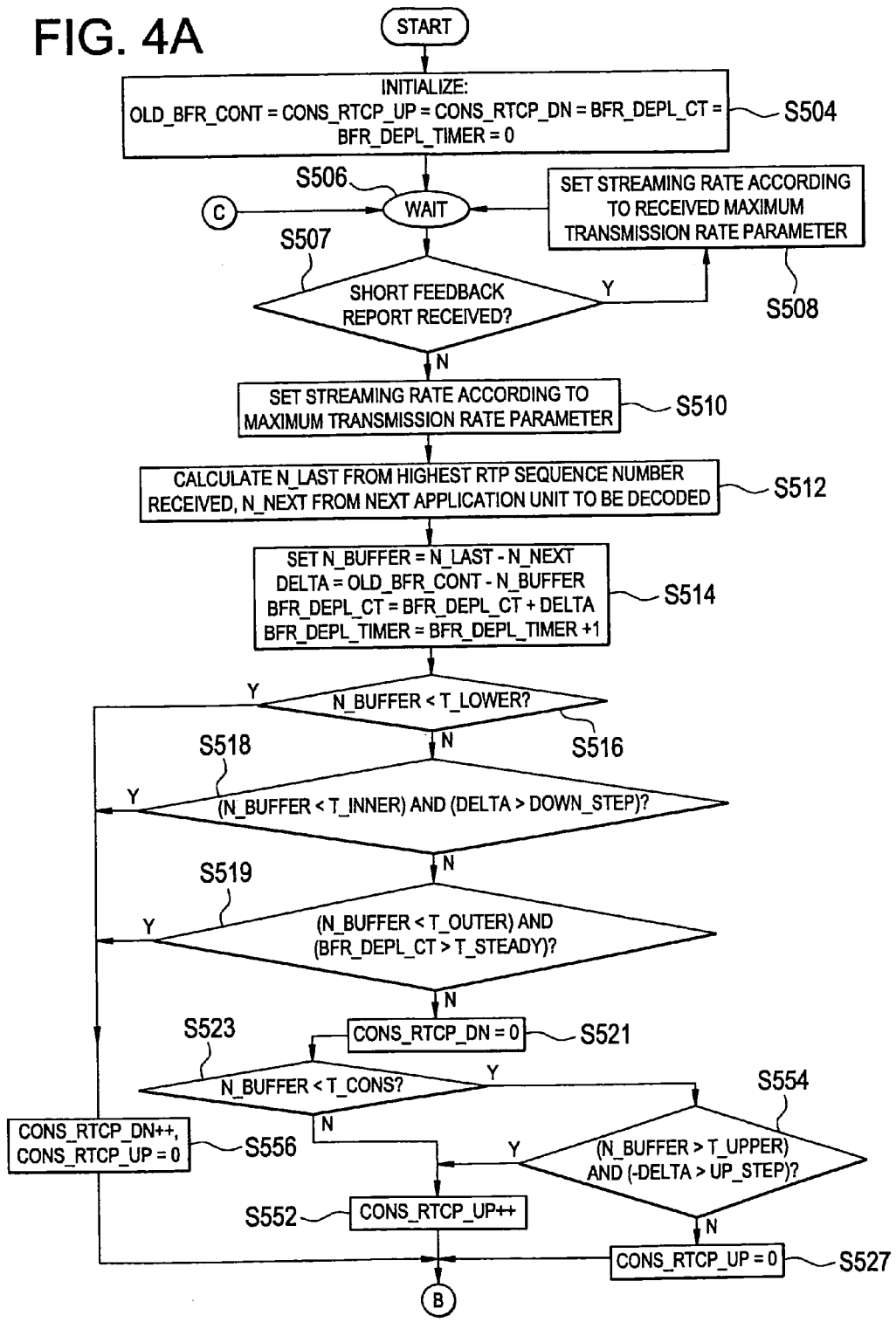
FIGS. 4A-4B illustrate a method for content rate selection at a media server according to an example embodiment.
Figure 4B:
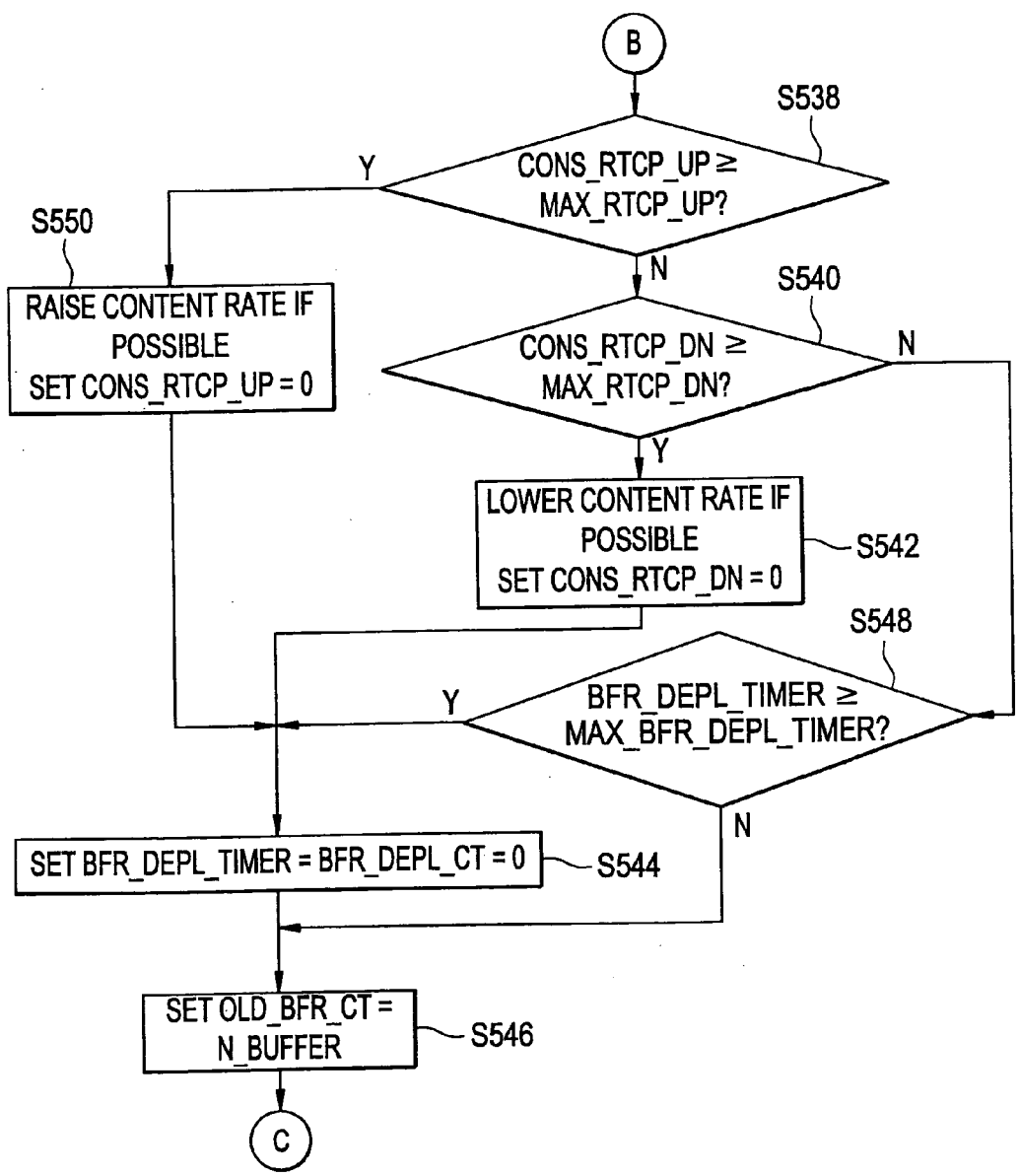

FIGS. 4A and 4B illustrate a method for content rate selection at a media server according to an example embodiment.

Referring to FIG. 4A, after performing capability negotiation for the media session with the client 210, the media server 215 sets the content rate in accordance with the negotiated parameters. After initially setting the content rate, the media server 215 initializes a plurality of content rate selection metrics to 0 at step S504. These plurality of content rate selection metrics include a favorable channel condition metric Cons_RTCP_Up, an unfavorable channel condition metric Cons_RTCP_Dn, a cumulative buffer content depletion metric Bfr_Depl_Ct, and a previous buffer content metric Old_Bfr_Cont. The media server 215 also initializes a timer value Bfr_Depl_Timer to 0.

The favorable channel condition metric Cons_RTCP_Up is a counter value that counts the number of consecutive proxy-to-server feedback messages that indicate favorable channel conditions for the media session. The unfavorable channel condition metric Cons_RTCP_Dn is a counter value that counts the number of consecutive proxy-to-server feedback messages that indicate unfavorable channel conditions for the media session.

According to at least some example embodiments, the channel conditions may be determined as being unfavorable based on given, desired or pre-determined criteria satisfied by one or more reported metrics such as client buffer levels falling below a threshold etc.

The cumulative buffer content depletion metric Bfr_Depl_Ct represents an amount of reduction in the content at the client buffer over a given time window. The timer Bfr_Depl_Timer is a timer used to track the time window over which the cumulative buffer content depletion metric Bfr_Depl_Ct is accumulated. Bfr_Depl_Timer may be chosen to span an integer number of extended feedback signaling periods from the signaling proxy 225 to media server 215. The media server 215 uses the cumulative buffer content depletion metric Bfr_Depl_Ct to accumulate values of the depletion (also referred to as step-drop) Delta over the given time window. The cumulative buffer content depletion metric Bfr_Depl_Ct is updated upon receipt of each extended feedback report message during the given time window. The cumulative buffer content depletion Bfr_Depl_Ct represents the total buffer content depletion since the beginning of the time window and may be indicative of a steady decrease in the client buffer content.

Depletion metric Delta is indicative of a channel's short-term inability to support the current content rate for the media session. As discussed herein, depletion metric Delta is also referred to as a "step drop" and defined as the difference between the previous buffer content metric Old_Bfr_Cont and the (current) buffer content metric N_Buffer. The previous buffer content metric Old_Bfr_Cont refers to the previous buffer content reported in the most recent previous extended feedback report message.

Still referring to FIG. 4A, after initializing the plurality of content rate selection metrics, the media server 215 enters a wait state at step S506. While in the wait state, the media server 215 awaits arrival of a proxy-to-server feedback message from the signaling proxy 225.

Upon receipt of a proxy-to-server feedback message, the media server 225 determines if the proxy-to-server message is an extended feedback report message or a short feedback report message at step S507.

If the received proxy-to-server feedback message is a short feedback report message, the media server 215 sets the streaming rate (transmission rate) equal to the maximum transmission rate parameter $W_S$ reported in the short feedback report message at step S508. The media server 215 then returns to the wait state at step S506 and proceeds as discussed herein. According to example embodiments, streaming rate is the rate at which media frames are actually transmitted by the media server 215. The streaming rate may be different from the content rate. Content rate selection is typically done on the basis of medium-term estimates of channel conditions. Streaming rate setting is driven by the short-term view of channel conditions. The average streaming rate may not be different from the average content rate for relatively long periods of time, however. For example, if the average streaming rate is smaller than the average content rate for a significant amount of time, the client device 210 may eventually run out of content to be played out.

Returning to step S507, if the received proxy-to-server feedback message is an extended feedback report message, the media server 215 sets the streaming rate equal to the maximum transmission rate parameter $W_S$ reported in the extended feedback report message at step S510.

At step S512, the media server 215 determines frame sequence numbers N_Last and N_Next based on the information contained in the extended feedback report message. The frame sequence number N_Last is the sequence number of the latest frame received by the client 210. The media server 215 determines the sequence number N_Last from the highest RTP sequence number reported in the extended feedback report message. The sequence number N_Next is the sequence number of the earliest frame received by the client 210. The media server 215 determines sequence number N_Next from the RTP sequence number associated with the next application data unit to be decoded as reported in the extended feedback report message.

Instead of using sequence numbers associated with frames, the media server 215 may use timestamps as the corresponding identifiers. If timestamps are used as identifiers, the computations associated with content rate selection decisions are in units of time rather than in units of frames. For example, buffer contents would be given in terms of the amount of time it would take to play out the corresponding frames rather than in terms of the actual number of frames contained in the buffer.

Referring back to FIG. 4A, after determining sequence numbers N_Last and N_Next at step S512, the media server 215 calculates/estimates a buffer content metric N_Buffer associated with the client 210 (or alternatively the media session itself) based on the sequence numbers N_Last and N_Next at step S514. The client buffer content metric N_Buffer represents the current content of the buffer at client 210.

In more detail, the media server 215 sets the metrics N_Buffer, Delta, and Bfr_Depl_Ct as follows:
N_Buffer←N_Last−N_Next;
Delta←Old_Bfr_Cont−N_Buffer; and
Bfr_Depl_Ct←Bfr_Depl_Ct+Delta.

Although not specifically shown in the figures, it should be noted that each of N_Buffer, Delta, and Bfr_Depl_Ct are initialized to 0 at the beginning of the time window over which Bfr_Depl_Ct is computed.

Still referring to step S514, the media server 215 increments the buffer depletion timer Bfr_Depl_Timer by 1 (Bfr_Depl_Timer←Bfr_Depl_Timer+1).

Still referring to FIG. 4A, at step S516, the media server 215 compares the buffer content metric N_Buffer with a minimum threshold value T_Lower. The threshold value T_Lower is in terms of a number of frames. If the buffer content metric N_Buffer falls below the minimum threshold T_Lower, the media server 215 determines that further fluctuations in channel conditions may lead to complete draining of the buffer at client 210, which results in re-buffering. Accordingly, the media server 215 sets the favorable channel condition metric Cons_RTCP_Up to 0, increments the unfavorable channel condition metric Cons_RTCP_Dn by 1 at step S556. The method then proceeds to step S538 (shown in FIG. 4B and discussed in more detail below).

If the buffer content metric N_Buffer is greater than or equal to the threshold T_Lower, the media server 215 compares the buffer content metric N_Buffer with an intermediate lower threshold T_Inner at step S518. Also at step S518, the media server 215 compares the depletion metric Delta with a step-down threshold Down_Step.

If, at step S518, the buffer content metric N_Buffer is less than the intermediate lower threshold T_Inner and the depletion metric Delta is greater than the step-down threshold Down_Step, the media server 215 once again determines that the channel conditions are unfavorable for the current content rate. Accordingly, the media server proceeds to step S556 and continues as discussed herein. Returning to step S518, if the buffer content metric N_Buffer greater than or equal to the intermediate lower threshold T_Inner and the depletion metric Delta is less than or equal to the step-down threshold Down_Step, the media server 215 compares the buffer content metric N_Buffer with an upper intermediate threshold T_Outer at step S519. Also at step S519, the media server 215 compares the value of the buffer content depletion metric Bfr_Depl_Ct with a depletion threshold T_Steady.

If the buffer content metric N_Buffer is less than the upper intermediate threshold T_Outer and the value of buffer content depletion metric Bfr_Depl_Ct is greater than the depletion threshold T_Steady, the media server 215 once again determines the current channel conditions to be unfavorable for the current content rate. Accordingly, the media server 215 proceeds to step S556 and continues as discussed herein. If the buffer content metric N_Buffer is greater than or equal to the upper intermediate threshold T_Outer and the value of buffer content depletion metric Bfr_Depl_Ct is less than or equal to the depletion threshold T_Steady, the media server 215 sets the unfavorable channel conditions metric Cons_RTCP_Dn, to 0 at step S521. The media server 215 then compares the buffer content metric N_Buffer with a channel conditions counter threshold value T_Cons at step S523.

If, at step S523, the buffer content metric N_Buffer is greater than or equal to the threshold T_Cons, the media server 215 determines the current channel conditions are favorable for higher content rates. Accordingly, the media server 215 increments the favorable channel condition metric Cons_RTCP_Up by 1 at step S552, and then proceeds to step S538 (shown in FIG. 4B). Returning to step S523, if the buffer content metric N_Buffer is less than the threshold T_Cons, the media server 215 compares the buffer content metric N_Buffer with a maximum threshold T_Upper at step S554. Also at step S554, the media server 215 compares the negative value of the depletion metric Delta (i.e., −Delta) with favorable channel condition threshold Up_Step. If the buffer content metric N_Buffer is greater than the maximum threshold T_Upper and the negative value of the depletion metric Delta is greater than the favorable channel condition threshold Up_Step, the media server 215 deems the current channel conditions to be favorable for higher content rates. Accordingly, the media server 215 proceeds to step S552 and continues as discussed herein. Returning to step S554, if the buffer content metric N_Buffer is less than or equal to the maximum threshold T_Upper and the negative value of the depletion metric Delta is less than or equal to the favorable channel condition threshold Up_Step the media server 215 sets the favorable channel conditions metric Cons_RTCP_Up to 0 at step S527, and then proceeds to step S538 (shown in FIG. 4B).

Turning to FIG. 4B, when the media server 215 reaches step S538, the media server 215 compares the favorable channel conditions metric Cons_RTCP_Up with a maximum favorable channel conditions threshold counter value Max_RTCP_Up. If the favorable channel conditions metric Cons_RTCP_Up is greater than or equal to the threshold value Max_RTCP_Up, the media server 215, at step S550, sets the content rate for the media session equal to the next higher content rate for the media session (if the content rate does not already equal the highest possible content rate for the media session), sets the favorable channel conditions metric Cons_RTCP_Up to 0, and then proceeds to step S544 (discussed in more detail later). Returning to step S538, if the favorable channel conditions metric Cons_RTCP_Up is less than the maximum favorable channel conditions threshold counter value Max_RTCP_Up, the media server 215 compares unfavorable channel conditions metric Cons_RTCP_Dn with a maximum unfavorable channel conditions threshold counter value threshold Max_RTCP_Dn at step S540.

If the unfavorable channel conditions metric Cons_RTCP_Dn is greater than or equal to threshold value Max_RTCP_Dn, the media server 215 sets the content rate for the media session to the next lower content rate for the media session (if the content rate does not already equal the lowest possible content rate for the media session), and sets the unfavorable channel conditions metric Cons_RTCP_Dn to 0 at step S542.

The media server 215 then sets the buffer depletion timer Bfr_Depl_Timer and the buffer depletion counter value Bfr_Depl_Ct to 0 at step S544. At step S546, the media server 215 then sets the previous buffer content metric Old_Bfr_Cont equal to the buffer content metric N_Buffer (Old_Bfr_Cont=N_Buffer). The media server 215 then returns to the wait state at step S506 and continues as discussed herein.

Returning to step S540, if the unfavorable channel conditions metric Cons_RTCP_Dn is less than threshold Max_RTCP_Dn, the media server 215 compares the value of the buffer depletion timer Bfr_Depl_Timer with a maximum buffer depletion timer threshold Max_Bfr_Depl_Timer at step S548. If the buffer depletion timer Bfr_Depl_Timer is less than the threshold Max_Bfr_Depl_Timer at step S548, the method proceeds to step S546 and continues as discussed herein.

Returning to step S548, if the value of the buffer depletion timer Bfr_Depl_Timer is greater than or equal to the threshold Max_Bfr_Depl_Timer at step S548, the method proceeds to step S544 and continues as discussed herein.

Figure 5:
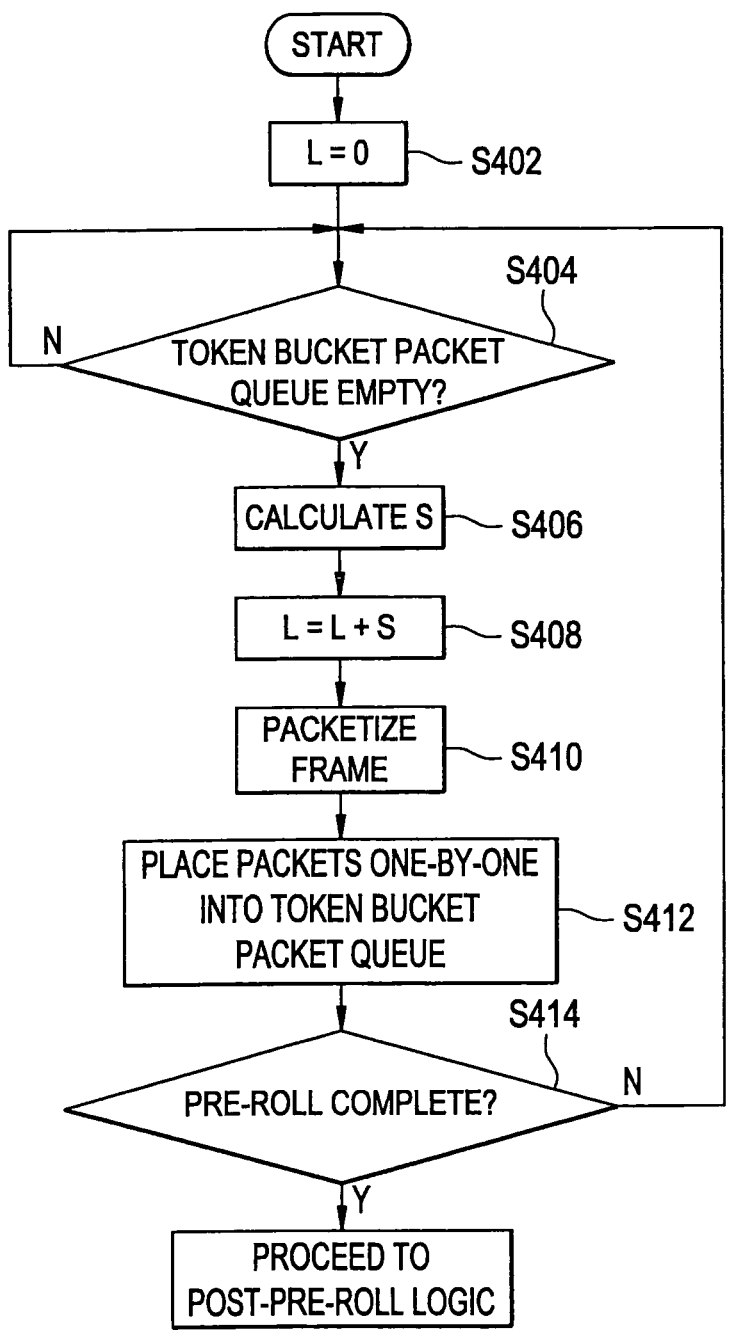
Figure 6:
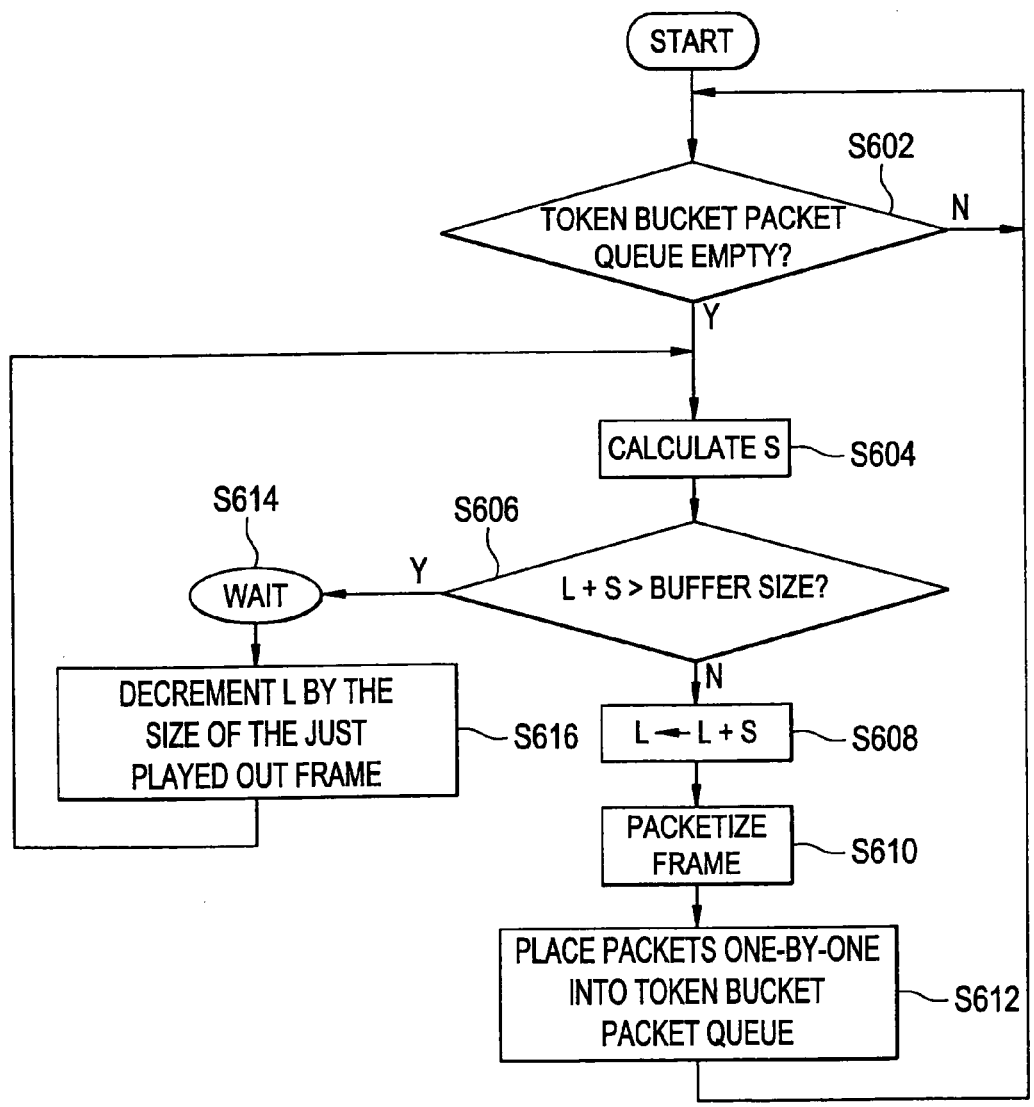

As noted above, the media server 215 also performs dynamic frame transmission scheduling or frame transmission rate control during a media session. As will be discussed in more detail below, FIGS. 5-7 illustrate methods for dynamic frame transmission scheduling according to example embodiments. The methods shown in FIGS. 5 and 6 pertain to processing/packetizing and queuing of frames to be transmitted to the client 210, whereas the method shown in FIG. 7 pertains to the flow controlled (token-bucket based) transmission of media session packets (packetized frames) to the client 210.

In more detail, FIG. 5 illustrates the processing/packetizing and queuing of frames for transmission to the client 210; that is, placement in the token bucket queue, during the pre-roll period. FIG. 6 shows the processing/packetizing and placement of frames in the token bucket queue during the post pre-roll period. These procedures shown in FIGS. 5 and 6 establish the earliest times that packets can be transmitted to the client 210. There may be further limitations on streaming rate to the client 210 (e.g., rate of transmission of media session packets, etc.) based on feedback messages, etc., which are enforced using the token bucket rate control mechanism in FIG. 7.

The objective of dynamic frame transmission scheduling is to ensure that the client 210 has the appropriate frames ready for decoding and play-out before their respective play-out times. The buffer space provided by the client 210 for the media session allows the media server 215 to transmit frames well ahead of their play-out times so that they are available at the client 210 as needed. This buffer space helps the client 210 overcome fluctuations in the channel bandwidth available to the media session.

There are two constraints that limit how far ahead of their respective play-out times frames can be transmitted by the media server 215. These constraints include the finite size of the client buffer (which the media server 215 becomes aware of during the capability negotiation for the media session) and the restriction on the transmission streaming rate conveyed periodically to the media server 215 by the signaling proxy 225; that is, the maximum transmission rate parameter $W_S$ included in each proxy-to-server feedback message. Frame transmission scheduling must be carried out within the streaming rate limit and also be done such manner that packets are not lost due to buffer overflow at the client 210.

A common and rather conservative approach (often referred to as "hypothetical receiver buffer") to avoid packet losses due to client buffer overflow is to assume that all packets transmitted by the media server 215, but not belonging to frames that have already been played out, are present in the buffer at the client 210.

Frame transmission scheduling is then performed such that the buffer space necessary to hold these packets does not exceed the buffer space allocated to the media session. For the sake of clarity, it is assumed that the media server 215 follows this conservative approach. However, example embodiments may be utilized in conjunction with other approaches to avoid packet loss such as temporary caching of packets in intermediate nodes.

The streaming rate limit may be imposed via a token-bucket-based rate control scheme, which will be discussed in more detail later with regard to FIG. 7.

Given the hypothetical-receiver-buffer method of avoiding packet losses due to client buffer overflow and the token-bucket-based streaming rate control, the media server 215 carries out frame transmission scheduling as shown in FIGS. 5 and 6.

FIG. 5 illustrates a method for frame transmission scheduling during a pre-roll period. The pre-roll period constitutes the period before the client 210 begins playing out received frames. As shown in FIG. 5, during the pre-roll period, the media server 215 attempts to transmit frames continuously subject to the limit imposed by the token-bucket-based transmission control, discussed in more detail later with regard to FIG. 7. That is, the media server 215 pushes frames out whenever it senses the packet queue associated with the token-bucket base transmission rate control is empty. Thus, packets belonging to the media stream are continuously transmitted at the rate determined by streaming rate control.

Referring to FIG. 5, in one example embodiment, at step S402 the media server 215 initializes the estimated client buffer level L to 0. The estimated client buffer level L is an estimate (byte-count) of the packets/frames present in the buffer at client 210 awaiting playout. At step S404, the media server 215 enters a state where it checks whether a token bucket packet queue is empty. The token bucket packet queue (or packet queue) is a buffer at the media server 215 storing media session packets awaiting transmission to the client 210. No action is taken until the packet queue is found to be empty.

In step S404, if the token bucket packet queue is empty, the media server 215 calculates the size S of the current frame of information to be transmitted at step S406. The size S of the current frame may correspond to the number of bits or the byte-count of the frame. Alternatively, the size of the frame may correspond to a particular length of the frame.

At step S408, the media server 215 increments the estimate of the client buffer level L by S (L←L+S). At step S410, the media server 215 packetizes the frame of information to be transmitted.

At step S412, the media server 215 places the packets into the packet queue.

At step S414, the media server 215 determines if the pre-roll period is complete. The pre-roll period is complete if all the frames that constitute the pre-roll period have been transmitted. If the pre-roll period is not complete, the method returns to step S404 and continues as discussed above.

Returning to step S414, if the pre-roll period is complete, the media server 215 performs the method shown in FIG. 6.

Once the pre-roll period is over and the client 210 begins playing out received media frames, frame transmission scheduling operates under the dual constraints of working within the rate limit imposed by the token-bucket-based transmission rate control (discussed in more detail later) and making sure that the server's estimate of the client buffer level L does not exceed the buffer size allocated to the media session. The flowchart shown in FIG. 6 illustrates a frame transmission scheduling method during the post-pre-roll period.

Referring to FIG. 6, at step S602, the media server 215 enters a state where it checks to see if the token bucket packet queue is empty. No scheduling action is taken by the media server until the packet queue is not empty. If the packet queue is empty at step S602, the media server 215 calculates the size S of the current frame of information to be transmitted at step S604. The media server 215 adds the size S with the estimated client buffer level L. If the sum of the estimated client buffer level L and the frame size S is less than the client buffer size at step S606, the media server 215 sets L equal to the sum of the estimated client buffer level L and the frame size S at step S608. The media server 215 packetizes the frame at S610, and places the packets into the packet queue at step S612. The method then returns to step S602 and continues as discussed above.

Returning to step S606, if the sum of the estimated client buffer level L and frame size S is greater than the client buffer size, the media server 215 enters a wait state at step S614 where it waits for a time period needed for the client to play out a frame. At step S616, the media server 215 decreases the estimated client buffer level L by the size of the frame that has just been played out. The method then proceeds to step S604 and continues as discussed above.

As discussed above, limits on the streaming rate at which packets can be streamed to the client 210 also constrain how far ahead of their respective play-out times frames can be transmitted by the media server 215. FIG. 7 illustrates a method for imposing a streaming rate limit via a token-bucket based rate control scheme. A token-bucket-based rate control scheme is characterized by three parameters: step-size $\Delta$, update interval $\tau$ and maximum credit level Gmax. A token-bucket scheme is also dependent upon a state variable G (referred to as the credit level) and the token bucket packet queue. As discussed above, the token bucket packet queue is a buffer at the media server 215 storing media session packets awaiting transmission to the client 210.

FIG. 7 illustrates a method for frame transmission rate control in which the media server 215 determines whether to transmit a packet to the client 210 based on a state variable associated with the media session and the availability of a packet (belonging to the media session) that is ready for transmission. The state variable is a credit level G. The media server 215 transmits the packet to the client 210 if the credit level G is greater than zero. Example embodiments of the method shown in FIG. 7 will be discussed in more detail below.

Referring to FIG. 7, at the beginning of the media session, the media server 215 initializes the credit level G to the maximum credit level Gmax at step S700. The media server 215 then sets a timer equal to the length of the update interval $\tau$ at step S702. In one embodiment of the invention as illustrated in FIG. 7, the update interval $\tau$ is chosen to be smaller than the time interval between play-out of consecutive frames. For example, the update interval $\tau$ may be chosen to be 20 ms when the play-out interval is 30 ms. After setting the timer, the media server 215 enters a wait state at step S704. While in the wait state, the media server 215 waits for a packet to be ready for transmission or for the timer to expire.

When the media server 215 receives (or generates) a packet ready for transmission (referred to as the "new packet"), the media server 215 checks if the packet queue is empty at step S706. If the packet queue is not empty, the new packet is placed at the end of the packet queue at step S710. The media server 215 then returns to the wait state at step S704 and the process proceeds as discussed herein.

Returning to step S706, if the packet queue is empty, the media server 215 checks the credit level G associated with the client 210 at step S708. If the credit level G is less than or equal to zero, the process proceeds to step S710 and continues as discussed above.

Returning to step S708, if the credit level G is greater than 0, the credit level G is decremented by the length of the new packet and the packet is transmitted at step S712. The method then returns to the wait state at step S704 and continues as discussed herein.

While in the wait state at step S704, if the timer expires the media server 215 increments credit level G by step size $\Delta$ at step S714. If the incremented value of the credit level G is greater than Gmax, the credit level G is set to Gmax. According to example embodiments, the step size $\Delta$ is equal to the product of the most recently received maximum transmission parameter $W_S$ and the update interval $\tau$ ($W_S * \tau$).

Still referring to FIG. 7, the media server 215 checks if the incremented credit level G is greater than 0 at step S716. If the credit level G is less than or equal to zero, the process returns to step S702, the timer is reset and the method continues as discussed above.

Returning to step S716, if credit level G is greater than 0, the media server 215 checks if the packet queue is empty at step S718. If the packet queue is empty, the method proceeds to step S702 and continues as discussed above.

Returning to step S718, if the packet queue is not empty, the media server 215 removes the first packet (e.g., the oldest or highest priority packet) from the queue and transmits the packet at step S720. Also at step S720, the media server 215 decrements the credit level G by the length of the transmitted packet. The method then returns to step S716 and continues as discussed above.

The invention being thus described, it will be obvious that the same may be varied in many ways. Such variations are not to be regarded as a departure from the invention, and all such modifications are intended to be included within the scope of the invention.

We claim:

1. A method for rate-control of a multimedia session for a client in a network, the method comprising:
   determining, by a server, whether a token bucket packet queue associated with the multimedia session is empty;
   calculating, by the server, a size of a frame to be transmitted to the client if the token bucket packet queue is empty;
   estimating, by the server, a client buffer level, the client buffer level being a buffer at the client and being associated with the multimedia session;
   waiting, by the server, for a time period associated with playing out a frame by the client and decrementing the client buffer level by the size of the frame to be transmitted to the client, upon a sum of the estimated client buffer level and the calculated size of the frame to be transmitted being greater than a client buffer size; and
   upon the sum being less than the client buffer size,
      setting, by the server, the size of the client buffer level to be the sum of the estimated client buffer level and the calculated size of the frame to be transmitted to the client,
      packetizing, by the server, the frame for transmission to the client, and
      scheduling, by the server, the packet for transmission.

2. The method of claim 1, wherein the scheduling step further comprises:
   placing the packetized frame into a token bucket packet queue for transmission to the client.

3. The method of claim 1, further comprising:
   comparing the estimated client buffer level with a buffer capacity for the client, wherein the packetizing step packetizes the frame for transmission only upon the estimated client buffer level being less than the buffer capacity.

4. The method of claim 3, wherein the scheduling step further comprises:
   placing the packetized frame into a token bucket packet queue for transmission to the client.

* * * * *